US012057006B2

(12) United States Patent
LeJeune, Jr.

(10) Patent No.: US 12,057,006 B2
(45) Date of Patent: Aug. 6, 2024

(54) SYSTEM AND METHOD OF TRACKING A MONITORING DEVICE

(71) Applicant: SATELLITE TRACKING OF PEOPLE LLC, Houston, TX (US)

(72) Inventor: David W. LeJeune, Jr., Conroe, TX (US)

(73) Assignee: SATELLITE TRACKING OF PEOPLE LLC, Houston, TX (US)

( * ) Notice: Subject to any disclaimer, the term of this patent is extended or adjusted under 35 U.S.C. 154(b) by 239 days.

(21) Appl. No.: 17/545,160

(22) Filed: Dec. 8, 2021

(65) Prior Publication Data

US 2023/0177946 A1    Jun. 8, 2023

(51) Int. Cl.
G08B 25/00   (2006.01)
G06F 1/16    (2006.01)
G08B 25/01   (2006.01)

(52) U.S. Cl.
CPC .......... *G08B 25/009* (2013.01); *G06F 1/163* (2013.01); *G08B 25/016* (2013.01)

(58) Field of Classification Search
CPC ....... A61B 5/681; B64C 39/024; G06F 1/163; G06F 3/04847; G06F 16/951; G06Q 10/06393; G06Q 10/0833; G08B 13/22; G08B 21/0266; G08B 21/0269; G08B 21/028; G08B 21/08; G08B 21/18; G08B 21/22; G08B 21/24; G08B 25/009; G08B 25/016; H04M 1/72448; H04M 11/002; H04W 4/02; H04W 4/021; H04W 4/023; H04W 4/029; H04W 64/00

USPC .................................................... 340/573.4
See application file for complete search history.

(56) References Cited

U.S. PATENT DOCUMENTS

| | | | | |
|---|---|---|---|---|
| 10,521,241 | B1* | 12/2019 | Ha | G06F 21/31 |
| 2005/0202830 | A1* | 9/2005 | Sudit | H04W 4/029 |
| | | | | 455/456.3 |
| 2007/0285258 | A1* | 12/2007 | Hartman | G08B 21/22 |
| | | | | 340/568.1 |
| 2014/0361892 | A1* | 12/2014 | Borlenghi | A45F 5/00 |
| | | | | 340/539.13 |
| 2016/0006577 | A1* | 1/2016 | Logan | H04W 4/80 |
| | | | | 700/276 |
| 2018/0012471 | A1* | 1/2018 | Bauer | H04W 4/029 |
| 2020/0250953 | A1* | 8/2020 | Wojcik | G08B 21/22 |

(Continued)

Primary Examiner — Stephen R Burgdorf
(74) Attorney, Agent, or Firm — Polsinelli PC

(57) ABSTRACT

A tracking system includes a central monitoring location, a tracking device, and a first tracking application. The first tracking application operates on a cellular device, the cellular device also having a second tracking application. The tracking device is lockably attachable to a limb of monitored person. The tracking device has first electronic hardware that provides health and status information about the tracking device to the first tracking application when in range, and second electronic hardware that is detectable by the second tracking application operating on the cellular device when in range, for which the second tracking application can determine relative location information about the tracking device relative to the cellular device and transmit the relative location information to an independent tracking database. The absolute and relative location information can be combined to provide a more accurate location of the monitored person.

18 Claims, 8 Drawing Sheets

(56) References Cited

U.S. PATENT DOCUMENTS

| | | | | |
|---|---|---|---|---|
| 2020/0334967 A1* | 10/2020 | Sharma | ............. | G08B 21/0453 |
| 2021/0274315 A1* | 9/2021 | Daoura | .................. | H04W 4/06 |
| 2021/0365865 A1* | 11/2021 | Jones | ............... | H04W 72/0453 |
| 2022/0107425 A1* | 4/2022 | Hornsby | ............... | H04W 84/18 |
| 2022/0405029 A1* | 12/2022 | Matsuoka | ............. | G06F 3/1285 |

* cited by examiner

US 12,057,006 B2

SYSTEM AND METHOD OF TRACKING A MONITORING DEVICE

FIELD OF THE INVENTION

Various embodiments described herein relate generally to locating a monitored person who has disabled their tracking device. More particularly, various embodiments herein relate to tracking a passive monitoring device.

BACKGROUND

The monitoring of movements of monitored individuals involves a variety of sectors, including parolees and home confinement. The technology has its roots in the home arrest systems of the 1980's, in which a user wearable component—typically a "beacon" bracelet that was locked to the monitored individual—would communicate wirelessly with a stationary base unit. The range was limited to a few feet of the radio frequency transmitter and receiver. The base unit included a telephone connection for communicating with the authorities. If the monitored individual left the short range allowed by the equipment—known in the industry as "bracelet gone"—the bracelet and the base unit would lose contact and the base unit would respond by sending an alert to the authorities. False alarms for minor deviations from the short range and/or an inability to confirm false from actual alarms (if the person was where they were supposed to be when the police arrived to investigate) desensitized the police to such alerts, rendering the technology of limited application to low risk offenders.

A later generation of the technology incorporated GPS and cellular telephone technology into the base station, which was now portable and equipped with batteries. If the monitored individual left the short range allowed between the tag and the portable monitored station, the tag and the base unit would lose contact and the base unit would respond by sending a bracelet gone alert to the authorities.

This so called "two-piece" tracking solution has numerous drawbacks. The design natively had the same bracelet gone drawbacks as its predecessor, but worse because the monitored individual is allowed to move and would easily lose or forget the portable base station. In a simple example, the monitored individual would leave for work and forget the base station at home, board a bus with their tracking bracelet still within range of the base station, and then the bus would separate the bracelet from the base station and trigger a bracelet gone alert. Also, the monitoring authorities would have no way to track the bracelet once it became separated from the base station.

Another problem was lack of accuracy on the location of the monitored individual. Since the GPS functionality was incorporated into the portable base station, the reported GPS location corresponds to the location of the portable base station and not the monitored individual. The monitored individual thus had free reign of untracked movement with the range of the bracelet-base station communications, which for a technology like Bluetooth is about 300 feet.

A later generation of the technology merged the bracelet and the base station into a single locked anklet as a so-called "one-piece" unit. The device would actively record the location of the monitored individual over time and transmit the data to a central monitoring location (e.g., police or parole monitoring services). U.S. Pat. Nos. 5,867,103, 6,160,481, 6,218,945, 6,512,456 and 6,703,936, incorporated herein by reference in their entireties, are each exemplary of such a system. The technology is also used to monitor other individual sectors (e.g., patients, children) and objects (e.g., cars, cargo).

The one-piece design eliminated the bracelet gone alerts. Accuracy dramatically improved, as the reported location was the actual GPS location of the one-piece unit on the monitored individual's ankle rather than a bracelet some unknown distance from the base station. Due to these advantages, the one-piece device quickly gained acceptance in the parolee tracking market, which had been notoriously hostile to new entrants.

The one-piece device was not without its disadvantages, particularly in size and power requirements. Between these relative advantages and disadvantages, the one-piece and two-piece devices have roughly equal market share in the parole tracking market.

Several item trackers have recently come to market, such as TILE PRO by TILE or AIRTAG by APPLE. These devices are detectable by a cellular device, such as the TILE app for APPLE or ANDROID phones or the FIND MY app on APPLE phones, such that the users can locate the time that the tracker is attached to.

These apps/devices can determine when the tracker is within a transmission range of the item tracker relative to a cellular device. When the item tracker is within that range of the cellular device, the app assists in finding the item tracker. In the case of TILE, the app can instruct the item tracker to issue a beep, and the user can follow the sound. In the case of the AIRTAG, the APPLE phone can provide a direction and distance to the AIRTAG, as well as beep if the AIRTAG moves too far from the cellular device.

If the item to which the item tracker is attached becomes lost outside of the range of the cellular device, the item tracker will connect with other phones that have the app and report its location to the third party database that maintains the information. The app can download the last known location of the item tracker from the third party database.

BRIEF DESCRIPTION OF THE DRAWINGS

Various embodiments in accordance with the present disclosure will be described with reference to the drawings, in which.

DETAILED DESCRIPTION

Figure 1:
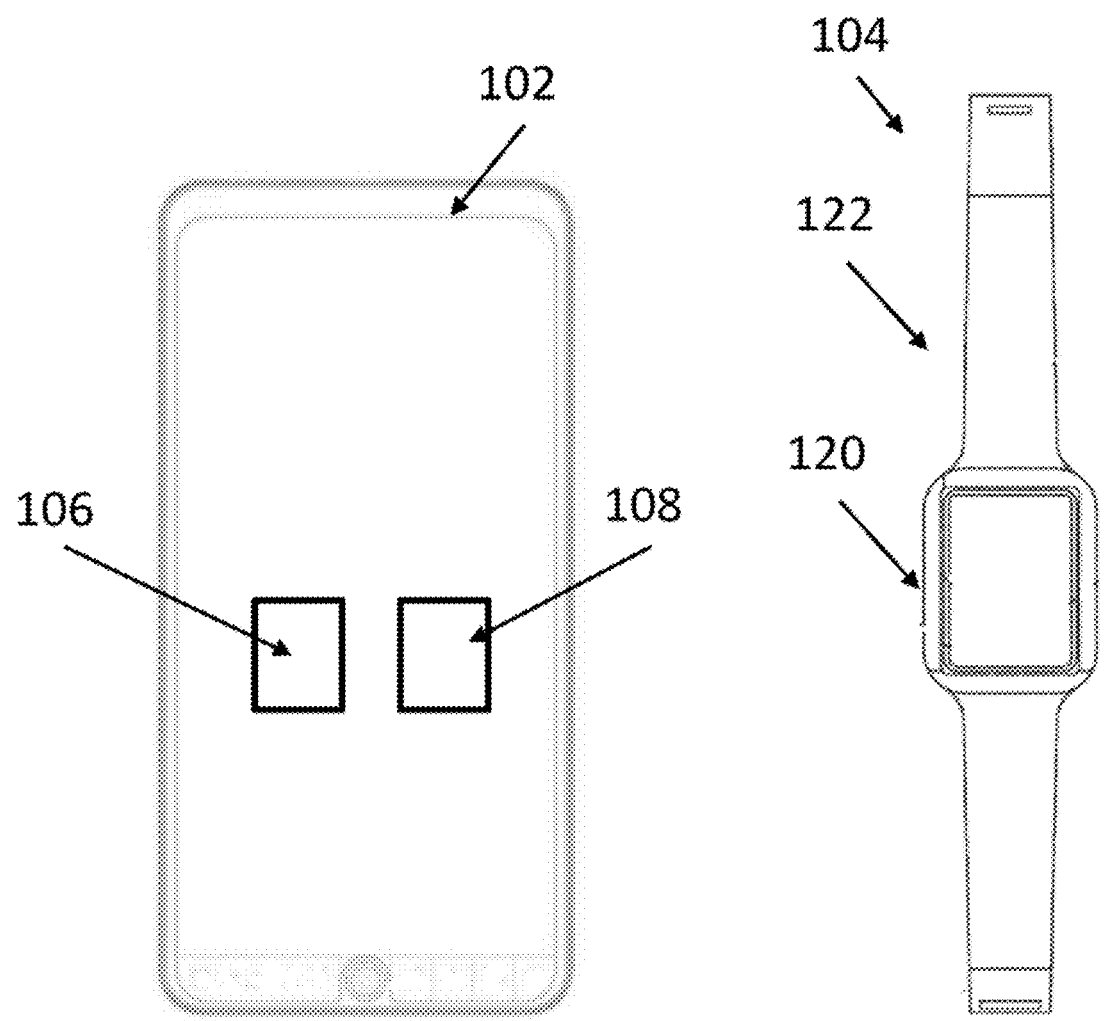
FIG. 1 illustrates an embodiment of a monitoring device.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. An individual skilled in the relevant art will recognize that other components and configurations may be used without departing from the scope and spirit of the claimed subject matter.

Several definitions that apply throughout this disclosure will now be presented. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" when utilized, means "including, but not necessarily limited to"; it specifically indicates open-ended inclusion or membership in the so-described combination, group, series and the like. The term "a" means "one or more" absent express indication that it is limited to the singular. "First," "second," etc. are labels to differentiate like terms from each other, and does not imply any order or numerical limitation.

The phrase "monitored population" refers to a group of individuals and/or objects that have issued monitoring devices and are subject to common electronic location monitoring by an oversight system. The phrase "monitored individual" refers to a particular individual in the monitored population.

The phrase "unmonitored individual" refers to a particular individual that is not within a particular monitored population. An unmonitored individual may be under no monitoring at all, or may be a monitored individual within a different monitored population. By way of non-limiting example, jurisdictions often run their own monitoring programs based on equipment from competitors that do not share information with each other. Thus, California may have an oversight system and corresponding monitored population for California residents, while Texas may have its own oversight system and corresponding monitored population for Texas residents. If the systems are not compatible or otherwise are not sharing data, then they are two different monitored populations. A monitored individual within California's system would thus be a monitored individual within the California monitored population, but an unmonitored individual within Texas' system because Texas is not monitoring that particular individual.

The phrase "general population" refers to people generally, and may include monitored and unmonitored individuals.

An "authorized individual" or "supervising authority" would be any one or more people having some type of supervisory responsibility and/or decision making relative to the monitored population or monitored individual therein. By way of non-limiting example, a parole officer would be the authorized individual relative to a parolee. Other non-limiting examples include parent/child, patient/medical supervisor, etc. Security and/or police could be considered a supervising authority relative to a population of monitored individuals to the extent the emergency level intervention is necessary. For sake of brevity, discussion herein is confined to parolee/parole officer relationship, although the invention is not so limited. The invention also applies to objects that can be monitored, such as cars or cargo.

In the concept of devices, a "mobile" or "cellular" device refers to wireless devices with wireless connectively to the cellular network that are designed to be routinely carried by individuals without access to utility power; non-limiting examples include cellular phones, tablets, PDAs and laptops. A common feature of a mobile device is an internal battery that allows for extended periods of use while away from utility electrical power. A "stationary" device refers to devices that are designed to be located for extended periods of time in a single location while operating off utility power; non-limiting examples include desktop PC's, servers and routers. A common feature of a stationary device is either the lack of an internal battery with corresponding full reliance on utility electrical power, or the presence of a battery (internal or external) for limited backup purposes in the case of loss of utility power. Mobile devices may at times be used as stationary devices (e.g., a laptop may be connected to utility power for an extended period of time and used at a single location), and stationary devices may at times act as mobile devices (in that at least any device can be relocated and at least for a brief period run off of a backup power), but this does not change their classification as mobile or stationary.

In the concept of technologically determining a geographic position of a person or object, the term "location" refers to the position that the technology identifies the person or object to be, as opposed to the actual physical location of the person or object. All such tracking technologies have some degree of margin of error such that any technologically determined location will not be an exact location of the person or object. For example, under certain conditions GPS has a known margin of error within 1-5 meters, and thus the location determined for a person using GPS under those conditions may differ from their actual position by 1-5 meters. Any such technological determinations of position are thus approximate based on the underlying accuracy of the tracking technology and margin of error. Any use of "location" in the specification or claims is to be considered modified by "approximate" to account for such variation whether expressly stated or not.

"Absolute location" means a position in a coordinate system, such latitude and longitude, map location, etc. The "corner of Main and $5^{th}$" is an absolute location.

"Relative location" means a position as defined relative to another object. "The tracker is feet from a wall" is a relative location of the tracker relative to the wall.

"Bracelet gone" is a term of art in the parole tracking art that refers to a condition where the tracking device is not reporting location data as expected. This may be because of the device tampering (e.g., cutting the band, cracking the device casing, jamming the device), device malfunction and/or natural conditions (e.g., a cell dead zone where the device cannot report over its cellular modem) such that the device is either not reporting at all or reporting faulty data.

"Probe signal" refers to a short range signal (on the order of hundreds of feet in range) emitted by a device with wireless connectivity methodologies that is effective to announce the device's presence and which is detectable by other wireless devices. Such signals may be to propagate the availability of the device and/or to establish a connection with another device. Non-limiting examples of wireless connectivity methodologies that utilize probe signals include Wi-Fi (which emit, e.g., "probe requests" to discover 802.11 networks within its proximity) and Bluetooth via its discovery mode (which emit, e.g., the ID of the device and a request to connect). Probe signals may be emitted by the device spontaneously or in response to outside stimulus. The invention is not limited to the any wireless connection methodology, the timing and/or contents of the signal.

FIG. 1 shows a block diagram of a personal monitoring system according to an embodiment of the invention. The personal monitoring device is a two-piece monitoring device 100 that includes a general purpose cellular device 102, and a wearable tag 104.

Figure 2:
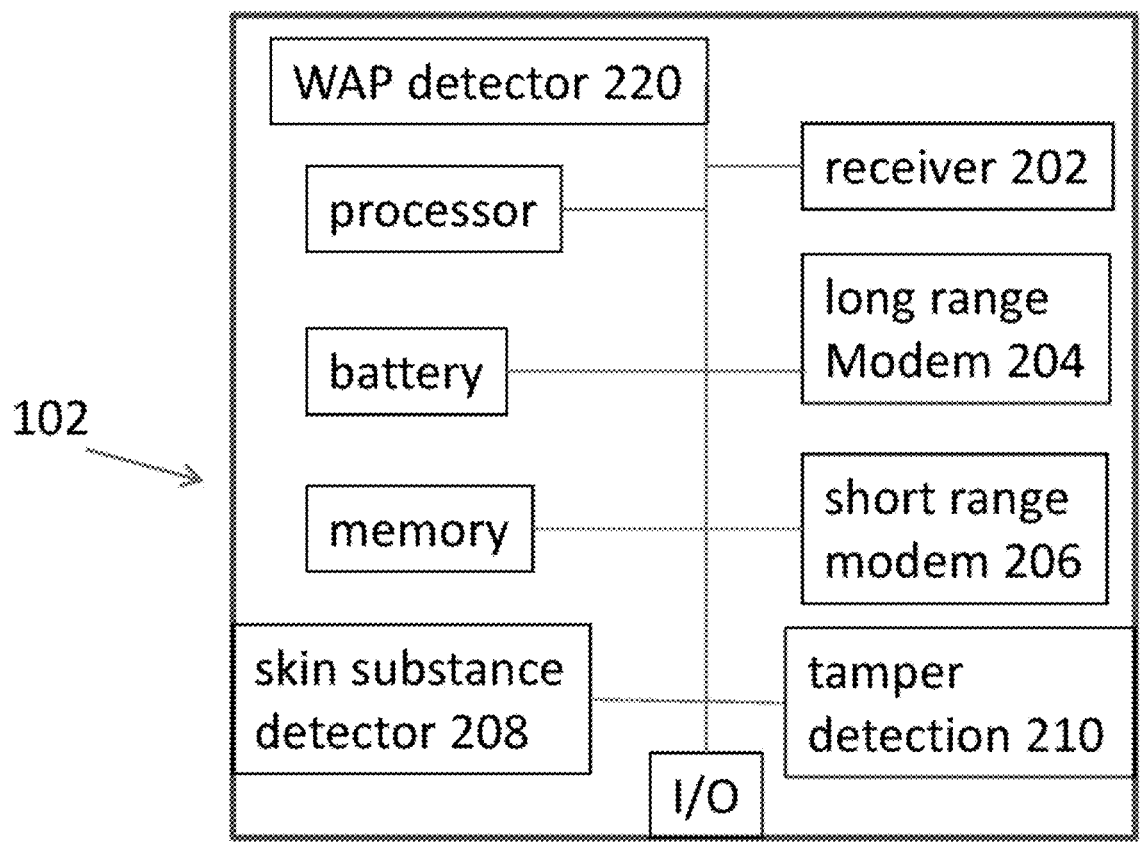
FIG. 2 illustrates an embodiment of the internal components of the monitoring device of FIG. 1.

General purpose cellular device 102 may be any commercially available cell phone, such as those manufactured by APPLE or SAMSUNG, although the invention is not limited to any particular device or vendor. As shown in FIG. 2. cellular device 102 includes well known components and associated software, including a GPS receiver 202 for location determination, a cellular modem 204 that allows for long range communications with the cell network, and one or more short range wireless modem 206 (e.g., 915 MHz or 802.11 compatible Wi-Fi or Bluetooth, ultra-wideband/ UWB on iPhones with its M1 chip) for nearly devices. Batteries, a power port, memory, I/O interface, wired communication access and other supporting computer hardware and software as is known in the art are also preferably provided and not discussed further herein. The invention is not limited to the details of the architecture of cellular device 102.

Wearable tag 104 includes a housing 120 for storing internal components as discussed in more detail below, and a band 122 that secures wearable tag 104 to a limb of the user, typically the ankle, via a locking mechanism that preferably can only be (legally) opened by an authorized individual.

Wearable tag 104 preferably has tamper detection, health monitoring, status monitoring, and short range communication capabilities as is known in the art and not further discussed further herein. Wearable tag 104 transmits such information to the cellular device 102 in a manner as known in the art.

Figure 3:
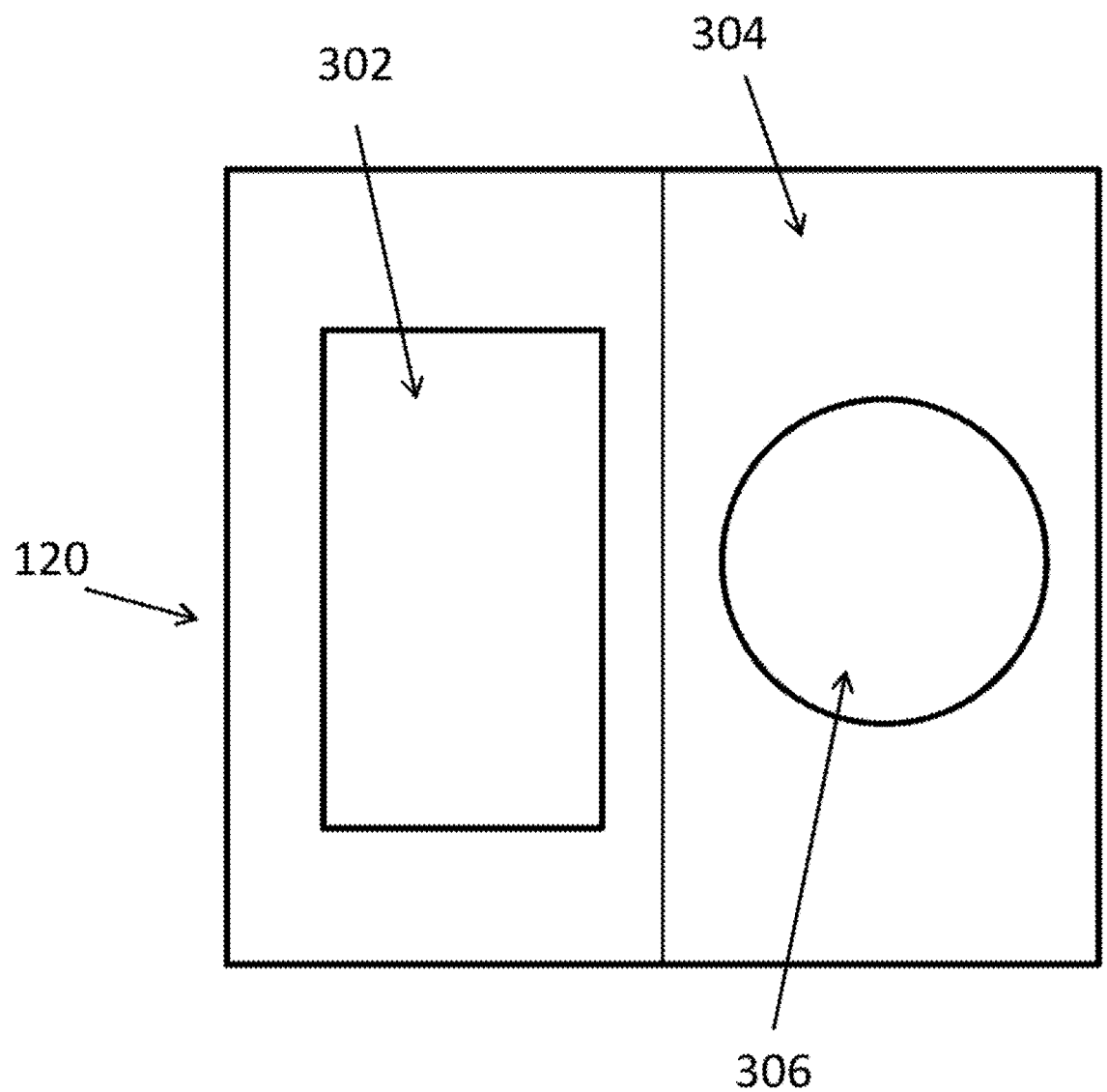
FIG. 3 illustrates an embodiment of the internal components of a wearable tag of the monitoring device of FIG. 1.

Referring now to FIG. 3, inside housing 120, wearable tag 104 includes internal components 302 as known in the art for the above noted tamper detection, health monitoring, status monitoring, and short range communication capabilities. In addition, housing 120 includes a cavity 304 for receiving an independent and self-contained tracker 306 as issued from an independent third party and incorporated into wearable tag 104. Tracker 306 may be completely independent of internal components 302, in essence being a component placed inside an appropriate space in wearable tag 104. However, the invention is not so limited, and the tracker 306 may cooperate with internal components 302 for power, communications, processing, etc.

Non-limiting examples of tracker 306 include the AIRTAG from APPLE, TILE by TILE.

Referring now back to FIG. 1, cellular device 102 can store and execute applications as is known in the art, such applications often being represented by icons on the display screen. Cellular device 102 in FIG. 2 shows two icons for two such apps, a first tracking application 106 and a second tracking application 108.

First tracking application 106 is programmed to cause cellular device 102 to function as the carried component of a two-piece tracking system. Such functionality is well known in the art and summarized herein for purposes of brevity. First tracking application 106 is programmed to cause cellular device 102 to routinely determine characteristics about itself and report some or all of those characteristics to a central monitoring location 410 in near real time and/or as batch transfers. The information includes the absolute location of the cellular device 102 from the GPS receiver and/or other known location methodologies, battery status, health and safety status, tampering status, and information about the wearable tag 104 (as discussed in more detail below), etc. First tracking application 106 may also be programmed to receive commands from the central monitoring location 410 station to provide data and/or information to app 106, wearable tag 104, cellular device 102, and/or the monitored person. The nature and variations on what are monitored, collected, reported, and/or reacted to is well known, and the invention is not limited to any particular implementation of the same.

First tracking application 106 may have various security features that limit the monitored person's access to first tracking application 106, second tracking application 108, and/or other apps or functionality of cellular device 102.

By way of non-limiting example, first tracking application 106 may require a password that the monitored person does not have access to, and without which the monitor person cannot interfere with the operation of the first tracking application 106. In another non-limiting example, the first tracking application 106 is programmed to periodically record its position and batch transfer location information at certain times, and the monitored person cannot deactivate that functionality.

A general purpose cellular phone such as cellular device 102 provides the ability to alter its operation and interactivity with its environment. Common features include the ability to enable or disable the cellular modem, the GPS receiver, wifi connections, BLUETOOTH connections, etc. First tracking application 106 may override any of these features to prevent the monitored person from changing their settings, e.g., greying out the buttons or screens by which these functions are normally accessed.

Second tracking application 108 may be any commercial third party app that cooperates with the tracker 306. By way of non-limiting example, TILE trackers cooperate with the TILE app, and the AIRTAG trackers par with the FIND MY app. By their native programming and when active on a cellular device 102, such apps can detect when the tracker 306 is within range of the cellular device 102 and report related location information to their support ecosystem.

First tracking application 106 and second tracking application 108 provide complementary information for tracking the monitored person. First tracking application 106 tracks the location and movements of the cellular device 102. Second tracking application 108 tracks the location and movements of wearable tag 104 as affixed to the limb of the monitored person. As discussed below, the two information sources combine to provide a tracking methodology for monitored persons that is superior to prior art two-piece tracking systems.

Figure 4:
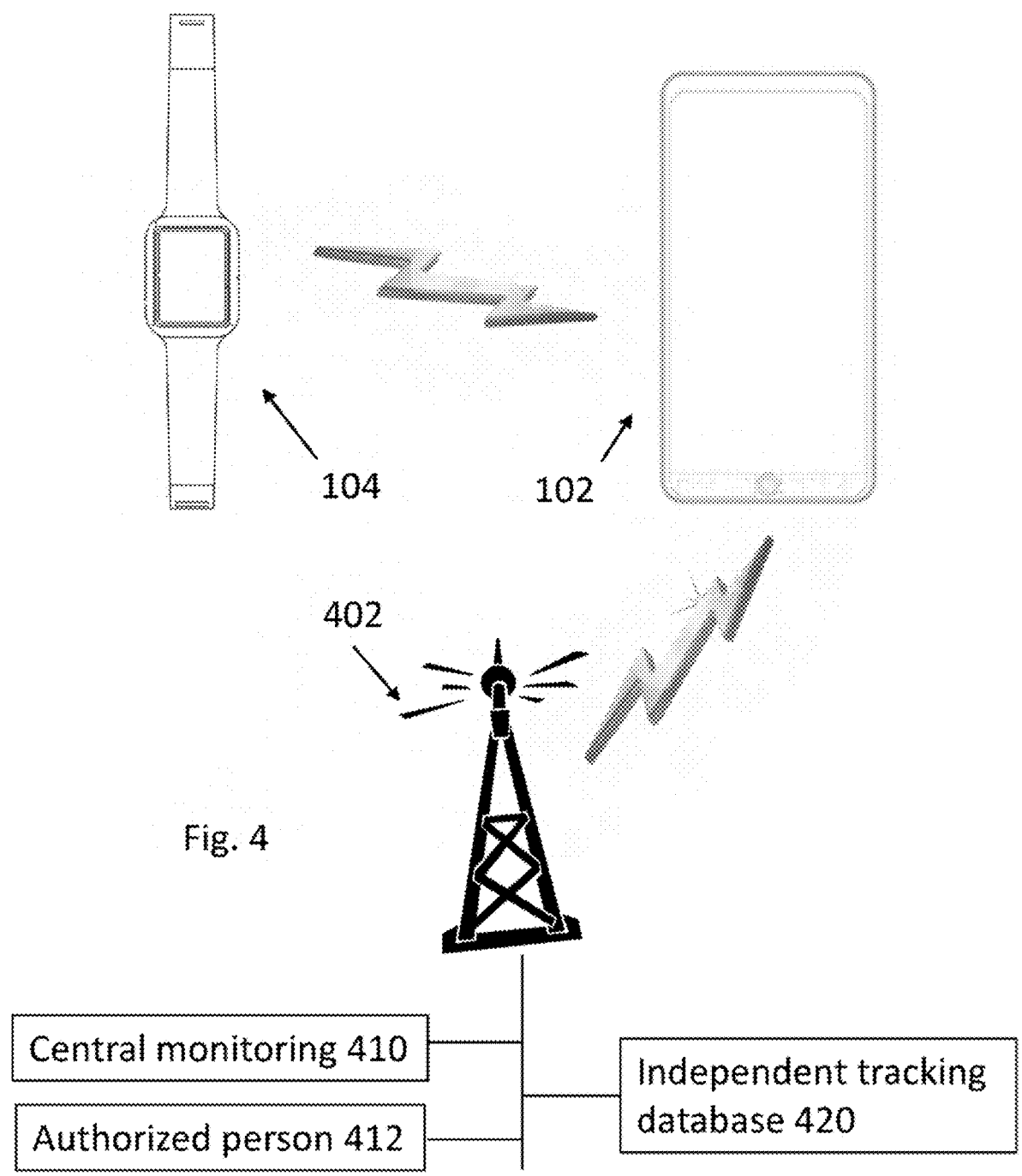
FIG. 4 shows communications to and from the monitoring device of FIG. 1.

Referring now to FIG. 4, wearable tag 104 sends signals and/or data—be it from internal components 302 or tracker 306—to cellular device 102. First and second tracking applications 106 and 108 process that information in the manner discussed above. Cellular device 102 then transmits the collected and/or processed information to the appropriate location. The transmission in FIG. 4 is through the cell network as represented by cell tower 402, but the invention is not so limited, and any communications pathway from the cellular device 102 to the end locations may be used.

First tracking application 106 will send its data to a central monitoring location 410 and/or an authorized person 412. In the parolee environment, central monitoring location 410 often a law enforcement agency or supporting contractor, and authorized person is a law enforcement office or parolee officer, although the invention is not so limited. The movement records of the monitored person are stored for record purposes, cross referencing for violations of specific time/ location requirements for the monitored persons, impermissible interactions of monitored persons, and/or comparison with crime data to see if the monitored person was proximate to a crime at a time of a crime.

Central monitoring location 410 is "central" in the sense that it serves one or more monitoring devices 100. It may be a single location, multiple locations operating independently, or a distributed arrangement. At a most basic level the central monitoring location 410 is no more than a computer (e.g., a server) having a memory, processor, modem, input/output, and other supporting computer hardware and software as is known in the art, although in practice they may be large facilities with distributed computers and human handlers. Functionality attributed herein to central monitoring location 410 is preferably implemented by software programmed onto electronic computer hardware. The invention is not limited to the architecture or layout of the central monitoring location 410.

Second tracking application 108 will send its data to the independent tracking database 420, which is run by whoever created and maintained tracker 306. By way of non-limiting example, the TILE app would send its data to wherever TILE stores location data for active TILE products. Similarly, FIND MY app (or other functionality/apps) on an APPLE phone would send its data to wherever APPLE stores location information for the active AIRTAGs.

Independent tracking database 420 is "independent" in the sense that it is operated by a different legal entity that central monitoring location 410 and run as a separate/independent product or service. By way of limited example, central monitoring location 410 may be an arm of the local police, while independent tracking database 420 is run by APPLE. The two organizations have no native interaction, and the police's access to APPLE's data is limited to whatever information is ordinarily available to the consuming public.

Independent tracking database 420 may be a single location, multiple locations operating independently, or a distributed arrangement. At a most basic level the independent tracking database 420 is no more than a computer (e.g., a server) having a memory, processor, modem, input/output, and other supporting computer hardware and software as is known in the art, although in practice they may be large facilities with distributed computers and human handlers. Functionality attributed herein to independent tracking database 420 is preferably implemented by software programmed onto electronic computer hardware. The invention is not limited to the architecture or layout of independent tracking database 420.

The information from first tracking application 106 in conjunction with cellular device 102 provides comparable functionality to the carried component of a prior art two-piece monitored device. It does so at a potential significantly lower cost, as the first tracking application 106 can be installed on the monitored person's cellular device 102, thus unless a phone is provided by the agency avoids the cost to the monitoring agency for providing a dedicated carried component of a two-piece device.

Standing alone, the information that first tracking application 106 provides to central monitoring location 410 has the same drawbacks as the prior art. The location that cellular device 102 provides is an absolute location of cellular device 102, but does not specifically identify the location of the wearable tag 104 other than it is within communication range of cellular device 102. The location provided by cellular device 102 is thus a proxy for the actual location of the wearable tag 104, but does not identify exactly where the wearable tag 104 is. It also does not provide a way to track the wearable tag 104 if it separates from the limited communication range from cellular device 102.

In embodiments herein, the additional presence of tracker 306 compensates for some or all of those drawbacks.

By way of non-limiting example, a main drawback of a prior art two-piece monitoring device is that it tracks the GPS location of the carried cellular device, but not the monitored person wearing the wearable tag. In some embodiments herein, the second tracking application 108 provides the local location of the wearable tag 104 relative to the cellular device 102, e.g., the wearable tag is five feet away from cellular device 102. Since the location of the cellular device 102 is known from the GPS data, the position of the wearable tag is discernable (at least partially) relative to that GPS location. This provides a higher degree of accuracy in the determined location of the monitored person that the prior art two-piece tracking system simply could not provide.

By way of non-limiting example, the TILE app can determine a proximity of a TILE device to a cellular device 102, which gives an approximate distance. In another non-limiting example, the FIND MY app can determine approximate distance and direction of an AIRTAG to a cellular device 102.

To the extent that this local location information is reported to independent tracking database 420 as maintained by TILE or APPLE, central monitoring location 410 can log into the independent tracking database 420 and retrieve that information. The GPS location information from first tracking application 106 provides the absolute location of the cellular device 102, and the relative location information from second tracking application 108 shows a location of wearable tag 104 relative to the cellular device 102. The two location information sources combined for enhanced location information defined by the GPS location of the cellular device and the short range location information from the tracker 306.

For example, if the GPS location of the cellular device 102 is the intersection of Main Street and First Avenue, and the local location of wearable tag 104 is 20 feet north of the cellular device 102, then the enhanced location information identifies the wearable tag 104 as 20 feet north of the intersection of Main Street and First Avenue.

Central monitoring location 410 can use the enhanced location of the monitored person for the location processing as discussed above. By way of non-limiting example, a monitored person is not allowed within 1000 feet of a school. In the prior art two-piece device, the monitored person could violate that perimeter by leaving the cellular device 1100 feet from the school and using the short range flexibility of the wearable tag (e.g., 300 feet) to cross the perimeter undetected. But with the enhanced location information as discussed above, the location of the wearable tag 104 would (at least partially) be known relative to the cellar phone. If the local location information showed the wearable tag to be 200 feet away in the direction of the school, then the system could identify the perimeter violation. Conversely, if the local information showed that the monitored person was only 50 feet from the cellular device 102, or 200 feet but in a direction away from the school, the system could confirm the lack of any boundary violation. Thus, the methodology is tracking the actual monitored person rather than the cellular device 102.

Another embodiment of the invention leverages the ability of third parties to locate tracker 306 through devices other than cellular device 102. By way of non-limiting example, AIRTAG or TILE products issue and/or are responsive to probe signals from other devices that have complementary software and/or hardware. TILE products are thus detectable by any cellular phone or other device that has the TILE app installed and active. Similar, AIRTAG products are detectable by APPLE products such as IPHONEs and IPADs. Such apps/products report detection of tracker to independent tracking database 420 for the companies as appropriate. If the tracker 306 is lost, a user can log into those databases, which will show the last known location of the tracker 306 relative to a product that detected it. Given the breadth and scope of the APPLE ecosystem, it is relatively easy to locate a missing AIRTAG because virtually any APPLE product would detect it.

In some embodiments, the tracking system leverages the above capability to respond to a bracelet gone alert for wearable tag 104. As discussed above, in the prior art two-piece tracking system, there is no way to track a monitored person with a wearable tag who has left their cellular device component behind. In these embodiments, the ability to independently locate tracker 306 through its native tracking capabilities provides a mechanism to track wearable tag 104 in response to a bracelet gone alert.

Specifically, when the first tracking application 106 losses contact with the internal components 302 of wearable tag 104, first tracking application 106 issues a bracelet gone alert to central monitoring location 410 and/or authorized person 412. Central monitoring location 410 and/or authorized person 412 can then log into the tracking database 320 and request the location of the specific tracker 306 incorporated into wearable tag 104. Independent tracking database 420 will respond with at least the last known location of the wayward tracker 306 as detected by other devices in the supporting ecosystem. Depending on the specific tracking service, this location may be of the device that detected the tracker 306, enhanced location information for the tracker 306 (location of the detecting device combined with relative location of distance and/or direction from the detecting device), or the specific location of the tracker 306. Such information may be current, historical (including prior detected locations) and/or ongoing (updating with current location information).

Based on the results, central monitoring location 410 and/or authorized person 412 may take action as appropriate. By way of non-limiting example, if the tracker 306 is in or approaching a restricted area, the police may be summonsed to intercept the monitored person based on the last known location as reported by tracking database 320. If the tracker 306 is in a location that is not of concern, the violation (separation of the wearable tag 104 from cellular device 102) may be noted for future discussion but not trigger any immediate response. If the tracker 306 is exactly where it is supposed to be, the incident may be disregarded as system or mechanical error.

According to another embodiment of the invention, first tracking application 106 and second tracking application 108 are separate as in the prior embodiment, but are cooperative at the cellular device 102. By way of non-limiting example, first tracking application 106 could receive the local location information from second tracking application 108. First tracking application 106 could then send that local location information to central monitoring location 410 along with the other location data that first tracking application 106 collects as above. First tracking application 106 could also combine the relative location information to create the enhanced location information, or the underlying data could be sent to central monitoring location 410 to create the enhanced location data. In either case, this methodology provides the local location information directly from cellular device 102, and thus avoids the need for central monitoring location 410 to obtain it separately from independent tracking database 420.

According to another embodiment of the invention, first tracking application 106 and second tracking application 108 are a single common application.

Figure 6:
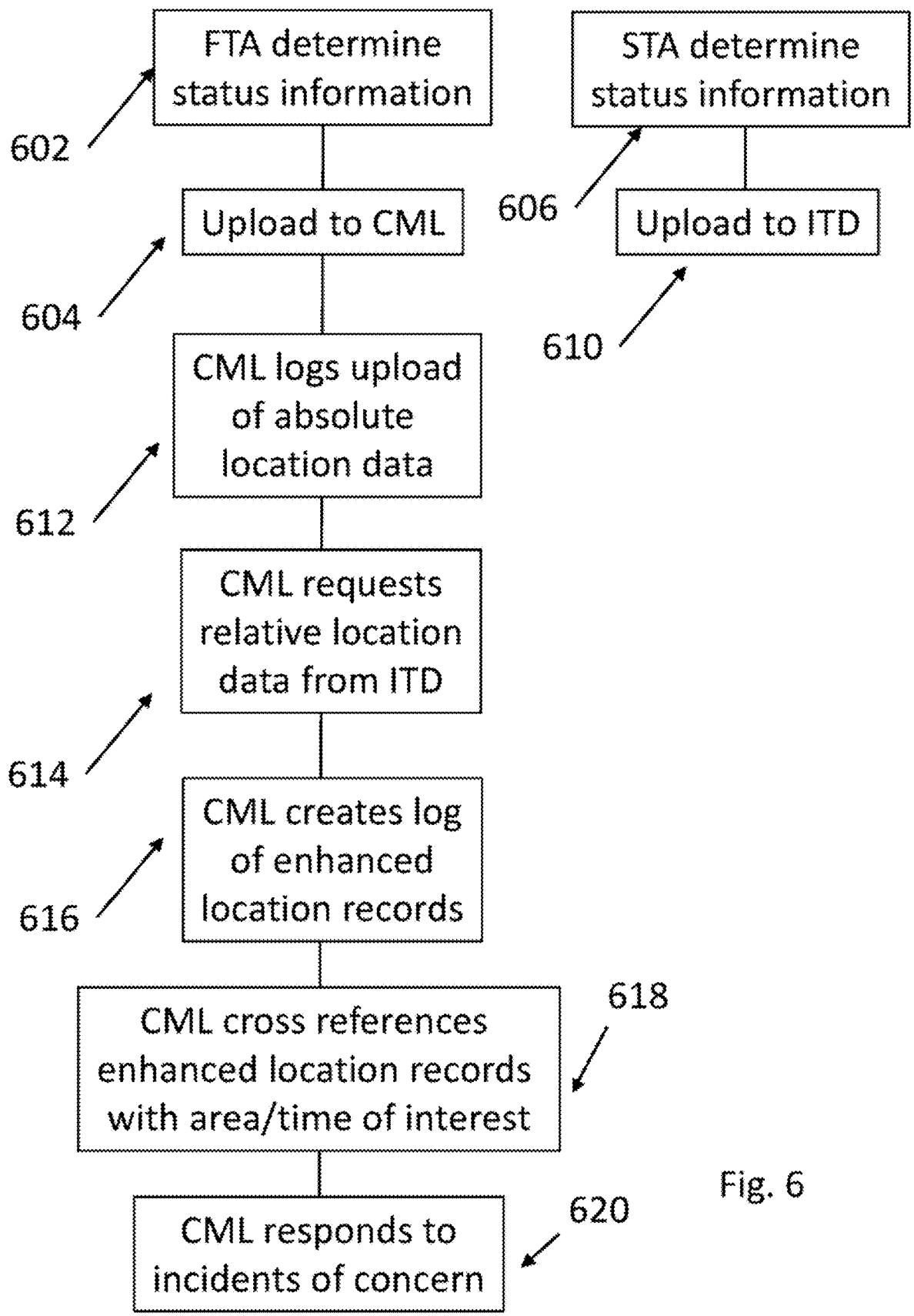
FIG. 6 is a flowchart of an embodiment of the invention.

Referring now to FIG. 6, a flowchart of operations of an embodiment of the invention is shown. At step 602, first tracking application 106 will determine and log status information about cellular device 102 and/or wearable tag 104. Such information may include, but is not limited to, absolute location of cellular device 102, health and battery status of cellular device, health and status of wearable tag 104 as may be provided by internal components 302, and that wearable tag 104 is within is detected within range of cellular device 102. This step 602 may repeat periodically, randomly, or occur in response to an event or trigger. For multiple iterations of step 602, the each iteration may determine and log the same information, or different information.

At step 604, first tracking application 106 will cause cellular device 102 to upload at least some of the collected data to central monitoring location 410. This may be a batch transfer of collected data over time, or a more specific single event transfer.

In parallel, second tracking application 108 will receive signal and/or information from tracker 306 as embedded in wearable tag 104. At step 606, second tracking application 108 will determine and log status information about tracker 306 from the received signals. Such information may include, but is not limited to, relative location of tracker 306 relative to cellular device 102. Non-limiting examples include tracker 306 is within range of cellular device 102, tracker 306 is certain distance from cellular device 102, and/or tracker 306 is a certain direction from cellular device 102, although the invention is not so limited. This step 606 may repeat periodically, randomly, or occur in response to an event or trigger. For multiple iterations of step 606, each iteration may determine and log the same information, or different information.

At step 610, second tracking application 108 will cause cellular device 102 to upload at least some of the data collected from tracker 306 to independent tracking database 420. This may be a batch transfer of collected data over time, or a more specific single event transfer.

At step 612, central monitoring location 410 receives the upload from first tracking application 106 as sent by cellular device 102 and creates records of movement data and status data for the corresponding monitored person. At step 614, central monitoring location 410 contacts independent tracking database 420 to obtain the corresponding relative location information as sent by second tracking application 108. At step 616, central monitoring location 410 combines the retrieved relative location information with the GPS location information to create a log of enhanced location data.

At step 618, central monitoring location 410 uses the enhanced location data to cross reference the location of the monitored person at a particular time or range of time with an area or location of interest. Non-limiting examples of areas of interest include an exclusion zone (an area where the monitored person is prohibited from entering), an inclusion zone (an area where the monitored person is required to be), or a crime scene. Since the monitored person's location is more accurate due to the combination of the GPS location and the local location, the cross reference results are more reliable than the prior art two-piece tracking system.

At step 620, central monitoring location 410 will respond to any incidents of concern from the cross reference at step 618. By way of non-limiting example, the monitored person was in the area of a crime at the time of the crime. At step 622, central monitoring location 410, either alone or in coordination with authorized person 412, will determine and implement appropriate responsive action. Non-limiting examples include dispatching authorities to the location of the monitored person, logging the event for future discussion with the monitored person, or disregarding the event as of minimal consequence.

Figure 7:
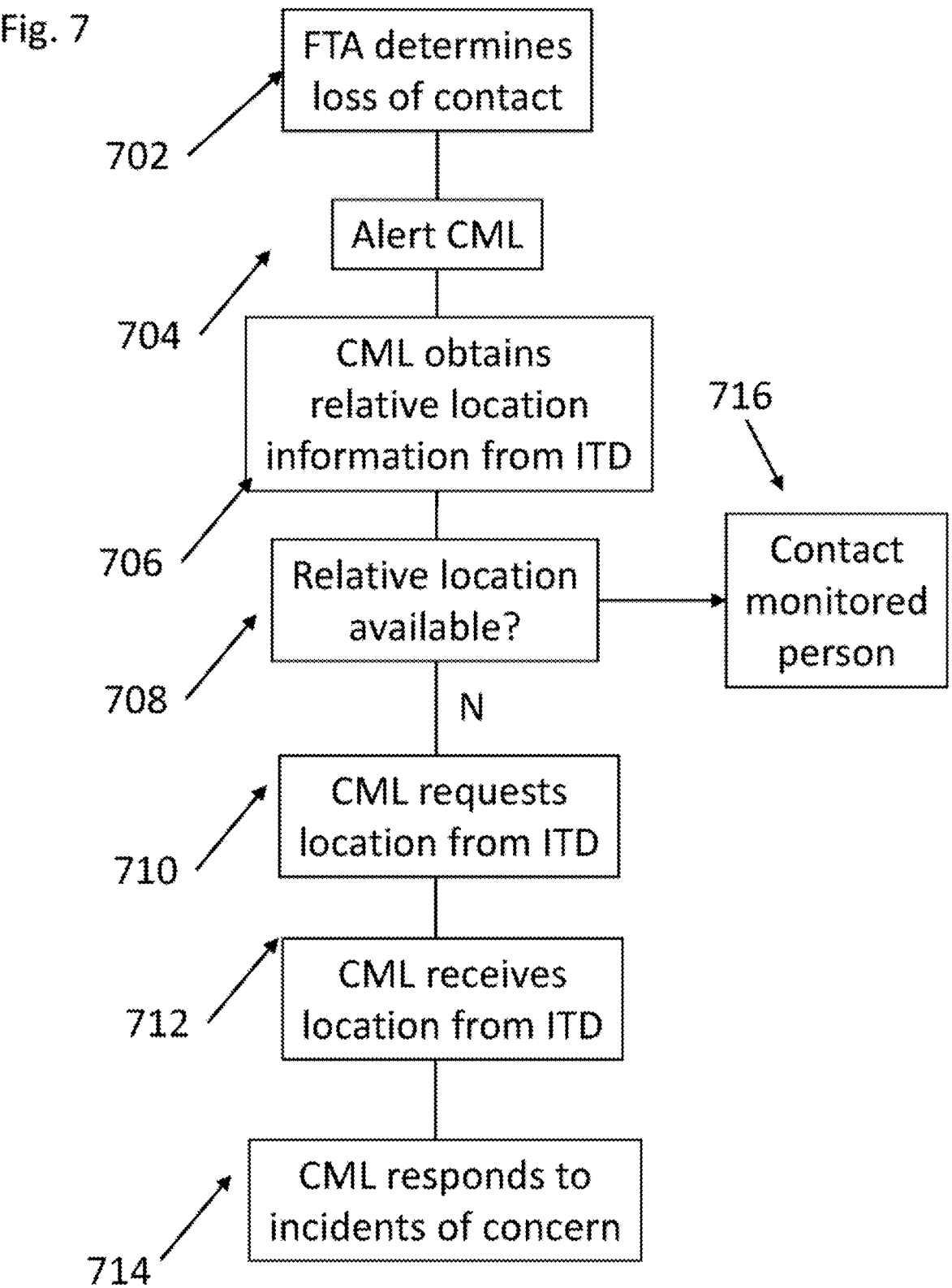
FIG. 7 is a flowchart of another embodiment of the invention.

Referring now to FIG. 7, a flowchart of another embodiment of the invention is shown. At step 702, first tracking application 106 identifies a loss of contact with wearable tag 104, e.g., the wearable tag 104 has moved out of range from the cellular device 102. The nature of the loss may be instantaneous or over time (e.g., loss of contact for over one minute, inconsistent contact for five minutes).

At step 704, first tracking application 106 causes cellular device 102 to send a bracelet gone alert to central monitoring location 410.

At step 706, central monitoring location 410 contacts independent tracking database 420 to obtain relative location information as sent by second tracking application 108. If such relative location information is available, this may indicate that the wearable tag 104 is still in range of the cellular device 102, but that the first tracking application 106 or related software/hardware is not functioning properly. Control may remain at step 706 to recheck the relative location information until the underlying problem is resolved. After a certain time, central monitoring location 410 may contact the monitored person at step 716 through the cellular device 102 or other communication avenues to advise them that their system is in need of service.

If the relative location information is not available, this would indicate that the wearable tag 104 is completely out of contact with cellular device 102. At step 708, central monitoring location 410 sends independent tracking database 420 a "find my tracker" request. In the APPLE ecosystem, this may correspond to a Find my AIRTAG request. At step 710, independent tracking database 420 will determine the last known and/or current location of tracker 306 as detected by the corresponding echo system, e.g., interaction of the AIRTAG with other APPLE products. At step 712, central monitoring location 410 receives the location information from independent tracking database 420. Step 712 may continue for some time to provide updated information as available, or control may return to step 706 for subsequent requests for information.

At step 714, central monitoring location 410, either alone or in collaboration with authorized person 412, will analyze the location information for tracker 306 to determine a course of action. By way of non-limiting example, if the monitored person is not where they are supposed to be, central monitoring location 410 may dispatch authorities to the location of the monitored person as shown by the location data for tracker 306. If the location information does not indicate any issue of concern, central monitoring location 410 can log the event with a flag for future discussion with the monitored person, or disregard the event as of minimal consequence. The invention is not limited to any particular identified circumstance or any specific reaction to a particular circumstance.

In an alternative embodiment, the flowchart of FIG. 7 does not execute steps 706 or 708, instead responding to a bracelet gone alert at step 704 with control directly passing to step 710 for the location information from independent tracking database 420.

In the above embodiments, second tracking application 108 may, on its own accord, also determine absolute position of the cellular device 102, and transmit that information for storage in the independent tracking database 420. Central monitoring location 410 may also request that information from independent tracking database 420 at step 616 and incorporate the response into records or utilize the information for other purposes (e.g., simply add the records from independent database 420 as additional movement records).

According to another embodiment of the invention, first tracking application would not determine and/or upload absolute location of cellular device 102 to central monitoring location 410. Instead, the methodology would leverage the absolute location data of cellular device 102 as provided by second tracking application 108 to independent database 420.

Implementation of the above embodiment would track the flowchart of FIG. 6. Steps 604 and 612 would proceed with health and status information, but not absolute location information. Step 614 would request absolute and relative location information (or whatever location information as may be available), and corresponding logs would be created at step 616.

According to another embodiment of the invention, first tracking application 106 could receive the relative location information, either by direct interaction with tracker 306. This methodology would not require specific interaction with independent tracking database 420, although such interaction could still occur for other purposes.

Implementation of the above embodiment would track the flowchart of FIG. 6. Steps 604 and 612 would proceed with health and status information, absolute location information and relative location information. Step 614 could be omitted, although it could still be performed as a cross-check or to receive other information as may be provided by independent tracking database 420.

Figure 5:
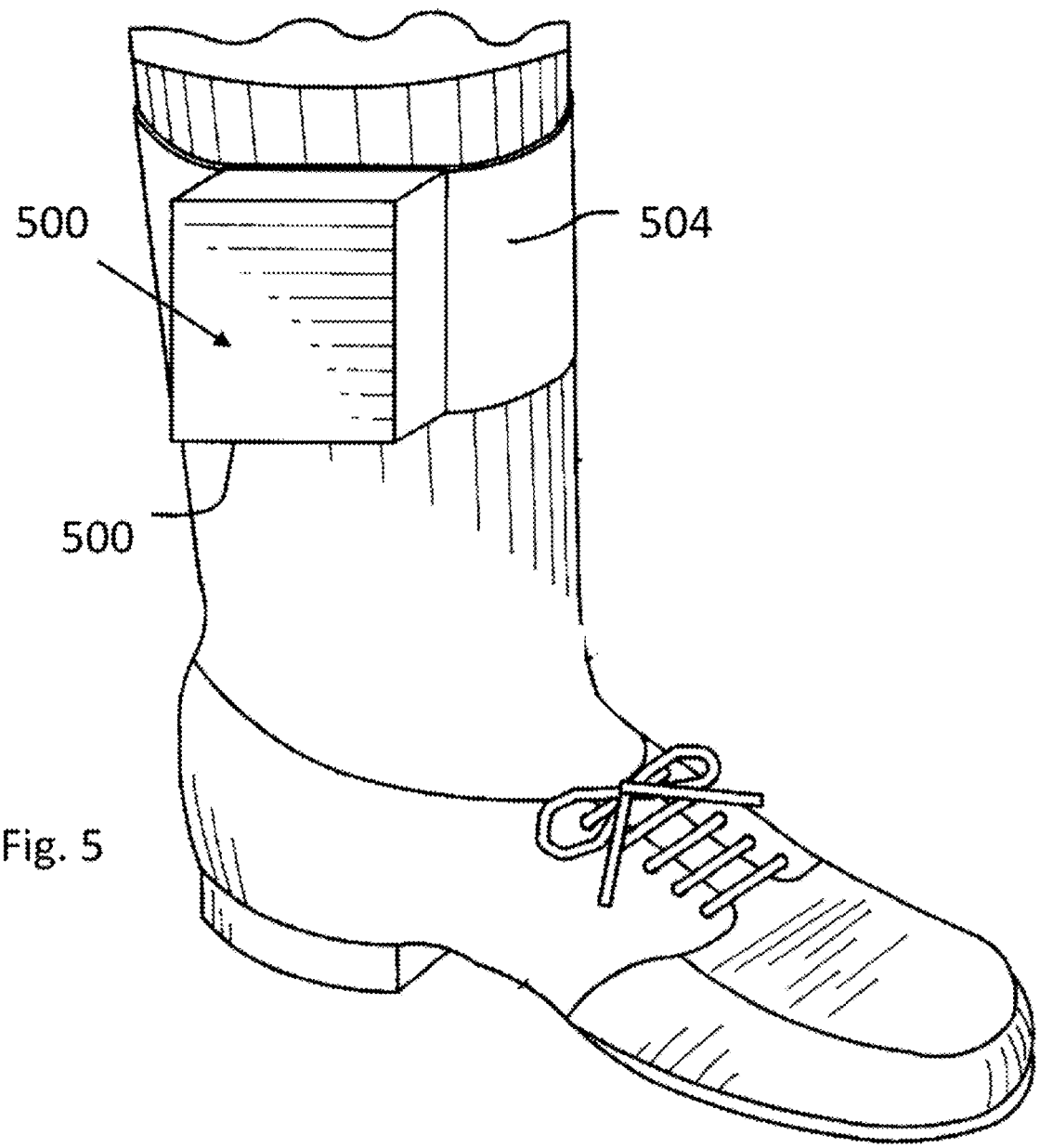
FIG. 5 shows another embodiment of a monitoring device.

According to another embodiment of the invention, the methodologies herein could be used in a one-piece tracking device 500, such as shown in FIG. 5. Such a one-piece device would include tracker 306 and the components shown in FIG. 2, and for which the structure and operation are well known in the art as including electronic hardware and software to determine its location, and transmit that information along with health and status information to central monitoring location 410 via cellular transmission on short range local transmission to appropriate cell towers/short-range routers.

In this embodiment, tracker 306 is embedded into a space within a housing 502 of tracking device 500, which is affixed to the monitored person by a lockable attachment shown generally at 504. With this implementation, if tracking device 500 is disabled due to mechanical failure, power loss, cellular interference, or the like, tracker 306 and independent tracking database 420 provide a fallback means of tracking the monitored individual.

In this embodiment, the concept of relative location data may not apply, as for a one-piece device there is no meaningful relative location difference between tracker 306 and GPS receiver 202.

Implementation of the above embodiment would track the flowchart of FIG. 6. Steps 614 and/or 616 could be omitted, or could be used to obtain whatever supplemental location information independent tracking database 420 can provide.

In an alternative to the above embodiment, the tracking device 500 would serve as a fallback to tracking tracker 306. In this embodiment, primary tracking responsibility would be through tracking tracker 306/independent tracking database 420, and central monitoring location 410 would obtain such records from independent tracking database 420. By way non-limiting example, for a tracker 306 that is an AIRTAG, APPLE can provide a movement history of movement of the AIRTAG. The methodology could primarily use that movement history rather than generate a corresponding movement history from the other tracking capabilities of tracking device 500.

In this embodiment, the tracking device 500 could ordinarily be largely dormant, except perhaps to occasionally wake up to report health and status information. Tracking device 500 could also wake up occasionally to provide its absolute location information, albeit on a schedule less rigorous than normal for such devices. By way of non-limiting example, tracking device 500 may determine its location once every minute and upload collected location data every ten minutes, but in this embodiment such location determinations may occur by way every ten minutes and the uploads occur every hour. This less frequent reliance on the tracking capabilities of the FIG. 2 components of tracking device 500 could significantly reduce power drain on the internal batteries, with a corresponding reduction in the frequency of required recharge of device 500.

Implementation of the above embodiment would track the flowchart of FIG. 6. Steps 604 and 612 would proceed with health information, status information, and absolute location information as provided on a reduced schedule. Step 614 would request available location information, and corresponding logs would be created at step 616.

In the above embodiment, the tracking device 500 could transition to its own native tracking via receiver 202 in response to some internal or external event. By way of non-limiting example, such an event could be a detected tamper event, loss of contact by tracking device 500 with central monitoring location 410, an instruction from central monitoring location 410, etc. In such cases, the schedule of tracking and/or transmission would adjust to accommodate the more active role of the components.

In an alternative one-piece embodiment, the one-piece tracking device 500 would lack the native ability to determine its absolute location and/or transmit that absolute location to central monitoring location 410. Instead, the methodology would entirely leverage the tracking capabilities of the tracker 306 and independent tracking database 420. In this case, the methodology would provide health and status information directly to central monitoring location 410.

Implementation of the above embodiment would track the flowchart of FIG. 6. Steps 604 and 612 would proceed with health and status information, but not absolute location information. Step 614 would request absolute and relative location information (or whatever information independent tracking database 420 could provide), and corresponding logs would be created at step 616.

In an alternative one-piece embodiment, the one-piece tracking device 500 would rely entirely on tracker 306 and independent tracking database 420 for communication and tracking. In this case, the methodology would provide the health and status information directly to tracker 306, either through wired or wireless transmission. Tracker 306 would incorporate that health and status information into its information feed to independent tracking database 420. Central monitoring location 410 would obtain the information from independent tracking database 420 without direct communication from tracking device 500.

Implementation of the above embodiment would track the flowchart of FIG. 6. Steps 604 would upload the health and status information to tracker 306. Step 612 would be omitted, step 614 would request location information, and corresponding logs would be created at step 616.

Figure 8:
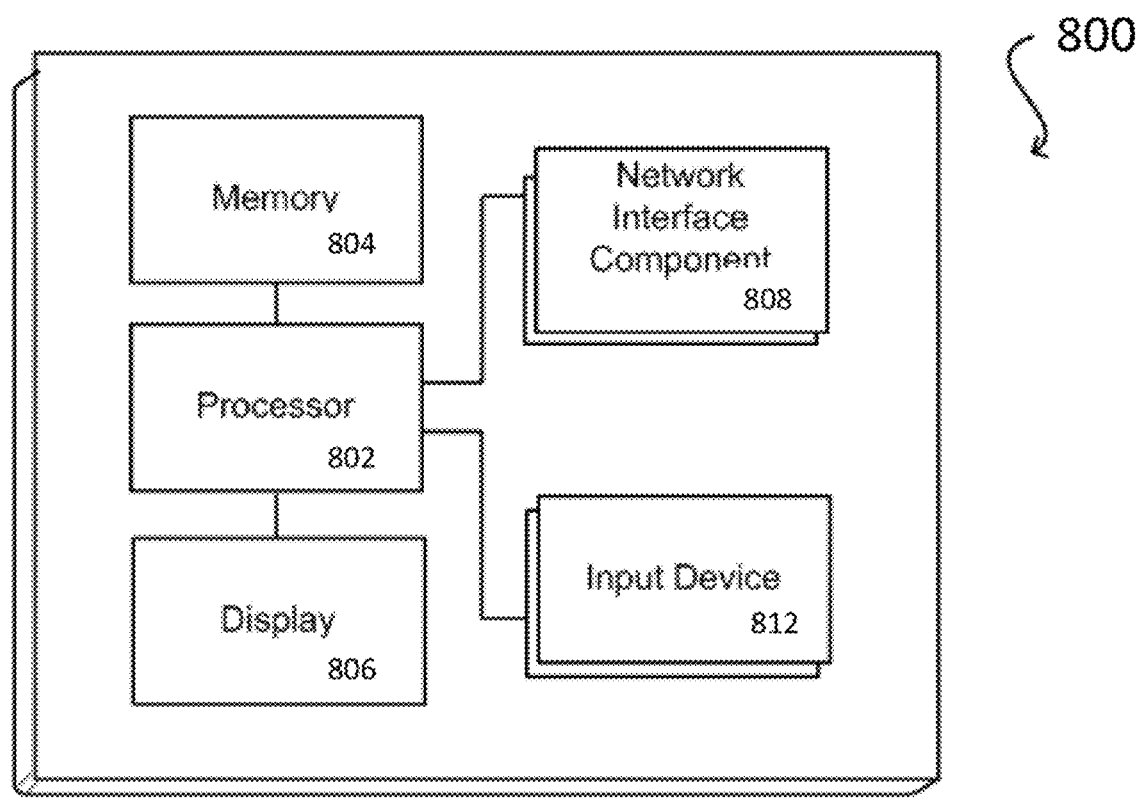
FIG. 8 illustrates a logical arrangement of a set of general components of an example computing device that can be utilized in accordance with various embodiments.

FIG. 8 illustrates a logical arrangement of a set of general components of an example computing device 1400 as could be used for the computer elements of any of the components herein described. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one input element 812 able to receive conventional input from a user. This conventional input can include, for example, a push button, touch pad, touch screen, keyboard, mouse, keypad, or any other such device or element whereby a user can input a command to the device. In some embodiments, the computing device 800 of FIG. 8 can include one or more network interface elements 1408 for communicating over various networks, such as a Wi-Fi, Bluetooth, RF, wired, or wireless communication systems. UWB could also be a communication mechanism—i.e. transmit strap tampers using extra bits in UWB. The device in many embodiments can communicate with a network, such as the Internet, and may be able to communicate with other such devices.

Each computing device typically will include an operating system that provides executable program instructions for the general administration and operation of that device and typically will include computer-readable medium storing instructions that, when executed by a processor of the server, allow the computing device to perform its intended functions. Suitable implementations for the operating system and general functionality of the servers are known or commercially available and are readily implemented by individuals having ordinary skill in the art, particularly in light of the disclosure herein.

Various embodiments discussed or suggested herein can be implemented in a wide variety of operating environments, which in some cases can include one or more user computers, computing devices, or processing devices which can be used to operate any of a number of applications. User or client devices can include any of a number of general purpose individual computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments where the computing device includes a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, an individual of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A tracking system including a central monitoring location, a tracking device, and a first tracking application, the system comprising:
   the first tracking application being configured to operate on a cellular device, the cellular device having a second tracking application, the cellular device having an interface to directly enable/disable at least one wireless connection feature of the cellular device;
   the tracking device lockably attachable to a limb of monitored person such that the monitored person cannot directly remove the tracking device, the tracking device having:
      first electronic hardware that provides health and status information about the tracking device to the first tracking application when in range;
      second electronic hardware that is detectable by the second tracking application operating on the cellular device when in range, for which the second tracking application can determine relative location information about the tracking device relative to the cellular device and transmit the relative location information to an independent tracking database;
   the first tracking application being programmed to:
      determine an absolute location of the cellular device over time and batch transfer that absolute location information, along with health and status information received from the tracking device, to a central monitoring location;
      lock out access to the interface on the cellular device such that the monitored person cannot directly disable the at least one wireless connection feature of the cellular device;
   the central monitoring location being programmed to:
      obtain the relative location information of the tracking device from the independent tracking database; and
      combine the absolute location information with the relative location information to provide, for at least a particular time frame, a location of the monitored person as relative to the absolute location of the cellular device.

2. The system of claim 1, wherein the relative location information includes presence, proximity and/or direction of the tracking device relative to the cellular device.

3. The system of claim 1, wherein the independent tracking database is part of an ecosystem in which other cellular devices cooperating with the ecosystem can detect the second electronic hardware, the central monitoring location being further programmed to:
receive an alert from the first tracking application that contact has been lost with the first electronic hardware of the tracking device;
send, to the independent tracking database, a request for at least a last known location of the second electronic hardware within the tracking device as detected within the ecosystem;
receive, from the independent tracking database, a location of the second electronic hardware within the tracking device.

4. The system of claim 3, further comprising:
dispatching authorities to the location as received by the central monitoring location.

5. The system of claim 3, wherein the location as received by the central monitoring location is based on a location of a particular cellular device, cooperating with the ecosystem, that detected the second electronic hardware.

6. The system of claim 1, wherein the first electronic hardware operates in combination with first software to provide the health and status information.

7. The system of claim 1, wherein the tracking device lacks an ability to directly determine its absolute location, such that the absolute location of the cellular device serves as a first proxy for the location of the tracking device, within a range of error defined by an operating range between the first electronic hardware and the cellular device.

8. The system of claim 7, wherein the combination of the absolute location information with the relative location information acts as second proxy for the location of the tracking device, the first proxy being less accurate that the second proxy.

9. The system of claim 1, wherein the central monitoring location being further programmed to:
send, to the independent tracking database, a request for at least a last known direction of travel of the second electronic hardware relative to the cellular device; and
receive, from the independent tracking database, the requested last known direction of travel.

10. The tracking system of claim 1, wherein the lock out access comprises greying out at least one button and/or at least one screen by which settings for the at least one wireless connection feature is accessed on the cellular device.

11. A tracking method using a central monitoring location, a tracking device, and a first tracking application on a cellular device, the method comprising:
locking the tracking device to a limb of monitored person;
sending, from the tracking device to a cellular device when in range, health and status information about the tracking device;
determining an absolute location of the cellular device over time;
batch transferring the absolute location information, along with health and status information received from the tracking device, to the central monitoring location;
locking out access to an interface on the cellular device such that the monitored person cannot directly disable the determining, the batch transferring, and receipt of signals from the sending;
obtaining, by the central monitoring location from an independent tracking database, relative location information of the tracking device relative to another device; and
combining the location of the another device with the relative location information to provide, for at least a particular time frame, a location of the monitored person as relative to the location of the another device.

12. The method of claim 11, further comprising:
determining, by the cellular device, a relative location of the tracking device relative to the cellular device;
sending, from the cellular device to the independent tracking database, the relative location.

13. The method of claim 12, wherein the relative location information includes presence, proximity and/or direction of the tracking device relative to the cellular device.

14. The method of claim 11, wherein the independent tracking database is part of an ecosystem in which other cellular devices cooperating with the ecosystem can detect the tracking device, the method further comprising:
receiving, at the central monitoring location, an alert from the cellular device that contact has been lost with the tracking device;
sending, to the independent tracking database, a request for at least a last known location of the tracking device as detected within the ecosystem;
receiving, from the independent tracking database, a location of the tracking device.

15. The method of claim 14, further comprising:
dispatching authorities to the location as received by the central monitoring location.

16. The method of claim 14, wherein the location as received by the central monitoring location is based on a location of a particular cellular device, cooperating with the ecosystem, that detected the tracking device.

17. The method of claim 11, further comprising:
sending, to the independent tracking database, a request for at least a last known direction of travel of the tracking relative to the cellular device; and
receiving, from the independent tracking database, the requested last known direction of travel.

18. The method of claim 11, wherein the locking out access comprises greying out at least one button and/or at least one screen by which settings for wireless connections on the cellular device is accessed.

* * * * *